(12) United States Patent
Palmer

(10) Patent No.: US 10,459,240 B2
(45) Date of Patent: Oct. 29, 2019

(54) STEREOSCOPIC THREE DIMENSIONAL PROJECTION SYSTEM WITH SHORT THROW RATIO

(71) Applicant: VOLFONI R&D, Villeneuve-Loubet (FR)

(72) Inventor: Stephen Palmer, Gateshead (GB)

(73) Assignee: Volfoni R&D, Villeneuve-Loubet (FR)

( * ) Notice: Subject to any disclaimer, the term of this patent is extended or adjusted under 35 U.S.C. 154(b) by 0 days.

(21) Appl. No.: 16/150,594

(22) Filed: Oct. 3, 2018

(65) Prior Publication Data
US 2019/0107729 A1   Apr. 11, 2019

Related U.S. Application Data

(60) Provisional application No. 62/570,924, filed on Oct. 11, 2017.

(51) Int. Cl.
*G03B 35/16* (2006.01)
*H04N 13/337* (2018.01)
(Continued)

(52) U.S. Cl.
CPC ............. *G02B 27/26* (2013.01); *G02B 13/02* (2013.01); *G02B 27/2264* (2013.01);
(Continued)

(58) Field of Classification Search
CPC .. H04N 13/337; H04N 13/341; H04N 13/363; H04N 13/346; G02B 27/26;
(Continued)

(56) References Cited

U.S. PATENT DOCUMENTS

| 3,551,036 A | 12/1970 | Bielusici |
| 7,477,206 B2 | 1/2009 | Cowan et al. |

(Continued)

FOREIGN PATENT DOCUMENTS

| CN | 103 616 772 A | 3/2014 |
| CN | 103616772 A * | 3/2014 |

OTHER PUBLICATIONS

International Search Report and Written Opinion, dated Jan. 18, 2019, received in international patent application No.PCT/IB2018/057705, 13 pages.

*Primary Examiner* — Ryan D Howard
(74) *Attorney, Agent, or Firm* — John W. Powell; Verrill Dana, LLP

(57) ABSTRACT

The present invention relates to a time-multiplexed stereoscopic 3d projection system wherein the image-beam from a digital cinema projector is separated by a polarization beam-splitting element into one primary image-beam possessing a first state of polarization and at least one secondary image-beam possessing a second state of polarization. Polarization modulators are provided in order to modulate the polarization state for each of said primary and secondary image-beams thereof and arranged so that all left-eye images possess a first modulated state of polarization and all right-eye images possess a second modulated state of polarization. Additionally, there is provided one uniaxial condensing lens and at least one uniaxial expanding lens in order to minimize the optical path-lengths for each of said primary and secondary image-beams thereof, hence enabling said stereoscopic 3d projection system according to the present invention to operate together with projectors having a shorter throw-ratio as compared to other prior-art technologies.

15 Claims, 6 Drawing Sheets

(51) Int. Cl.
*G02B 27/26* (2006.01)
*G02B 27/22* (2018.01)
*G03B 35/26* (2006.01)
*G02B 27/28* (2006.01)
*G03B 21/28* (2006.01)
*G02B 13/02* (2006.01)
*H04N 9/31* (2006.01)
*H04N 13/341* (2018.01)
*H04N 13/363* (2018.01)

(52) U.S. Cl.
CPC ........... *G02B 27/283* (2013.01); *G03B 21/28* (2013.01); *G03B 35/26* (2013.01); *H04N 9/317* (2013.01); *H04N 9/3167* (2013.01); *H04N 13/337* (2018.05); *H04N 13/341* (2018.05); *H04N 13/363* (2018.05)

(58) Field of Classification Search
CPC .......................... G02B 13/02; G02B 27/2264; G02B 27/2235; G03B 35/22; G03B 35/16
See application file for complete search history.

(56) References Cited

U.S. PATENT DOCUMENTS

| | | |
|---|---|---|
| 7,528,906 B2 | 5/2009 | Robinson et al. |
| 7,857,455 B2 | 12/2010 | Cowan et al. |
| 8,220,934 B2 | 7/2012 | Schuck et al. |
| 9,740,017 B2 | 8/2017 | Hoang et al. |
| 2009/0128780 A1* | 5/2009 | Schuck ................ G02B 26/008 353/20 |
| 2013/0182227 A1 | 7/2013 | Schuck |
| 2015/0103318 A1 | 4/2015 | Lee et al. |
| 2016/0301920 A1* | 10/2016 | Lim ......................... G02B 5/04 |

* cited by examiner

Fig. 1 (prior-art)

Fig. 2 (prior-art)

Fig. 3 (prior-art)

STEREOSCOPIC THREE DIMENSIONAL PROJECTION SYSTEM WITH SHORT THROW RATIO

CROSS-REFERENCE TO RELATED APPLICATION

This application claims the benefit of priority to U.S. Provisional Application No. 62/570,924, filed Oct. 11, 2017, which is incorporated herein by reference.

FIELD OF INVENTION

The present invention relates to a stereoscopic three dimensional (3d) projection system with a short throw-ratio, and more specifically to a time-multiplexed stereoscopic 3d projection system designed to provide a stereoscopic 3d image with good optical quality and on-screen homogeneity when used together with a digital cinema laser projector.

BACKGROUND OF THE INVENTION

Stereoscopic three dimensional (3d) projection systems have been used for many years. One technology known to the art and described, for example, in U.S. Pat. No. 7,528,906B2 dated 23 Jan. 2006 and entitled "Achromatic Polarization Switches", describes how a polarization modulator can be placed in-front of a single-lens projector, such as a 3-chip DLP digital cinema projector or otherwise.

The projector is arranged so as to generate a single image-beam comprising a rapid succession of alternate left and right-eye images at high speeds of typically 144 Hz (hertz). The polarization modulator imparts an optical polarization state to images generated by said projector and said polarization modulator is operated in synchronization with said projector in order to arrange for all left-eye images to possess a first state of circular polarization and all right-eye images to possess a second state of circular polarization, with said first and second states of circular polarization being mutually orthogonal (i.e possessing opposite senses of rotation, for example with said first optical state comprising clockwise or right-handed circular polarization and said second optical state comprising anticlockwise or left-handed circular polarization).

Thereafter, said left and right-eye images are focused onto the surface of a polarization-preserving projection-screen such as a silver-screen or otherwise, thereby enabling the viewing of time-multiplexed stereoscopic 3d images via utilization of passive circular-polarized viewing-glasses.

Furthermore, it will be known to one skilled-in-the-art that said polarization modulator may comprise of at least one or more liquid crystal elements stacked together in order to achieve the required electro-optical switching characteristics. One technology known to the art for achieving this criterion and described, for example, in U.S. Pat. No. 7,477,206B2 dated 6 Dec. 2005 and entitled "Enhanced ZScreen modulator techniques", describes how said polarization modulator may comprise of two individual pi-cell liquid crystal elements stacked together in mutually crossed orientation such that the surface alignment-directors in the first pi-cell are orthogonal to the surface alignment-directors in the second pi-cell thereof. Pi-cell liquid crystal elements are known to the art and characterized by the surface alignment-director on each substrate being aligned mutually parallel. Therefore, in at least one optical state the liquid crystal materials composing said pi-cell form a helical structure between said substrates with an overall twist of 180 degrees (i.e pi or $\pi$ radians). A detailed description of the design and function of pi-cell liquid crystal elements can be found elsewhere in the literature according to the prior-art.

Moreover, each pi-cell liquid crystal element can, for example, be rapidly switched between a first optical state possessing an optical retardation value that is substantially equal to zero when driven with high voltage (eg. 25 volt) in order to switch said liquid crystal materials to the homeotropic texture, and a second optical state possessing an optical retardation value that is substantially equal to 140nm (nanometers) when driven with a low voltage (eg. 3 volt) in order to switch said liquid crystal materials to the splay texture. The homeotropic texture is characterized by the molecular axes of said liquid crystal materials being aligned substantially perpendicular to the surfaces of said substrates, whereas the splay texture is characterized by said molecular axes being aligned substantially parallel with said substrates and furthermore with the twist within said liquid crystal materials being substantially equal to zero. Moreover, said pi-cell liquid crystal elements are capable of being rapidly switched between said first and second optical states thereof at high speeds of greater than typically 250 µs (microseconds) and are therefore often used when designing such polarization modulators according to the state-of-the-art.

It will also be known to one skilled-in-the-art that when said pi-cell liquid crystal element possesses a retardation value substantially equal to 140nm, then said pi-cell constitutes an optical Quarter-Wave-Plate (QWP) for the central part of the visible wavelength spectrum (i.e green wavelengths) and will therefore convert incident linearly polarized visible light to circular polarization.

Therefore, by stacking together two individual pi-cell liquid crystal elements in mutually crossed orientation together with a linear polarization-filter located at the input surface of said stack in order to first convert the initially randomly polarized (i.e unpolarized) incident light generated by said projector to linear polarization, then the images generated by said projector can be rapidly modulated between left and right circular polarization states by operating said pi-cell liquid crystal elements mutually out-of-phase according to the state-of-the-art. Specifically, when said first pi-cell is operated with high voltage (i.e liquid crystal materials are switched to said homeotropic texture) then said second pi-cell is simultaneously operated with low voltage (i.e liquid crystal materials are switched to said splay texture), and vice versa according to the prior-art.

However, since the images generated by a typical 3-chip DLP digital cinema projector are initially randomly polarized (i.e unpolarized), then the linear polarization-filter located at the input surface of said polarization modulator will absorb approximately 50% of the incoming light initially generated by said projector. This will therefore significantly reduce the overall optical light efficiency of said single image-beam system according to the state-of-the-art, thereby resulting in the creation of stereoscopic 3d images that are severely lacking in on-screen image brightness.

One technology known to the art for increasing the overall optical light efficiency of a stereoscopic 3d projection system and described, for example, in U.S. Pat. No. 7,857,455B2 dated 18 Oct. 2006 and entitled "Combining P and S rays for bright stereoscopic projection", and again in U.S. Pat. No. 8,220,934 dated 29 Sep. 2006 and entitled "Polarization conversion systems for stereoscopic projection", uses a polarization beam-splitting element in order to split the incoming randomly polarized incident image-beam generated by a single-lens projector into one primary image-beam propagating in the same direction as said original incident image-beam and possessing a first state of linear polarization, and one secondary image-beam propagating in a perpendicular direction relative to said incident image-beam and possessing a second state of linear polarization, with said first and second states of linear polarization being mutually orthogonal.

Thereafter, a reflecting mirror or otherwise is used to modify the optical path for said secondary image-beam and deflect said secondary image-beam towards the surface of a projection-screen, thereby enabling both said primary and secondary image-beams to be arranged so as to mutually overlap to a substantial extent on the surface of said projection-screen thereof. Such double image-beam systems according to the state-of-the-art therefore enable both polarization components composing said initial incident image-beam generated by said projector to be used in order to recreate the overall on-screen image, thereby increasing the resulting image brightness.

Additionally, a polarization rotator is typically required in order to rotate the linear polarization state of said secondary image-beam by substantially 90 degrees and ensure that both said primary and secondary image-beams thereafter possess the same linear state of polarization. Furthermore, one or more polarization modulators are then placed within the optical path of at least one of said primary and secondary image-beams thereof and operated in synchronization with said projector in order to arrange for all left-eye images to possess a first state of circular polarization and all right-eye images to possess a second state of circular polarization, with said first and second states of circular polarization being mutually orthogonal. Stereoscopic 3d images can hence be observed on the surface of said projection-screen via utilization of passive circular-polarized viewing-glasses.

However, the double image-beam system described above according to the state-of-the-art has the disadvantage in that there is a relatively large optical path-length difference between said primary and secondary image-beams thereof, thereby typically requiring the use of a telephoto-lens pair in order to compensate for said optical path-length difference. A telephoto-lens is an optical lens that possesses a relatively long focal-length and which can focus an incident and mutually parallel light-beam to substantially a single point (i.e the focal-point). The telephoto-lens is therefore mandated to have at least one surface that is simultaneously curved around two mutually orthogonal axes in order to create a spherical or ellipsoidal surface, for example with said surface being simultaneously curved around both the horizontal and vertical axes. However, such spherical or ellipsoidal lenses typically suffer from the occurrence of a high level of optical aberration and are also relatively difficult to manufacture which adds both complexity and expense to the overall system.

It will also be understood by one skilled-in-the-art that the aforementioned double image-beam system described above will also be limited in terms of the minimum throw-ratio that can be achieved by said projector. The throw-ratio is defined as being the distance D between the lens of said projector and the surface of said screen, divided by the width W of the image created on said screen (i.e throw-ratio=D/W).

Specifically, when a short throw-ratio is required, the image-beam generated by said projector is mandated to possess a relatively large angle of divergence. Moreover, since the total overall optical path-length for at least the secondary image-beam within said double image-beam system is relatively long, then the high angle of beam divergence will necessitate the requirement of using relatively large optical components such as but not limited to the beam-splitting element, reflecting mirror, polarization rotator and polarization modulators. However, due to limitations on the largest possible sizes of said optical components from both a practical and engineering point-of-view, this limits the maximum value of angular divergence for said image-beam that can be used, thereby also limiting the minimum throw-ratio that said double image-beam system can achieve. Moreover, since many cinema auditoriums often require the use of a projector with a short throw-ratio, this limits the potential usefulness of said double image-beam system according to the state-of-the-art.

An improved system for the displaying of high brightness stereoscopic 3d images according to the state-of-the-art is described, for example, in US patent application publication no. 2015/0103318A1 dated 2 Apr. 2013 and entitled "Stereoscopic image apparatus", and again in U.S. Pat. No. 9,740,017B2 dated 29 May 2013 and entitled "Optical polarization device for a stereoscopic image projector". Here, a beam-splitting element is used to separate the randomly polarized incident image-beam generated by a single-lens projector into one primary image-beam propagating in the same direction as said original incident image-beam and possessing a first state of linear polarization, and two secondary image-beams propagating in mutually opposite directions that are also both substantially perpendicular to said original incident image-beam and possessing a second state of linear polarization, with said first and second linear polarization states being mutually orthogonal. The beam-splitting element typically comprises of two plates joined together along one edge to form a chevron or V-shape structure and with the connecting edge for each of said plates being beveled at an angle of substantially 45 degrees in order to allow both said plates to be placed together in close proximity according to the state-of-the-art.

Thereafter, reflecting surfaces such as mirrors or otherwise are used to direct the optical paths for each of said secondary image-beams towards a polarization-preserving projection-screen and arranged such that said primary and secondary image-beams partially overlap in order to mutually combine and recreate a complete image on the surface of said projection-screen thereto. Such triple image-beam systems therefore once again enable both polarization components composing said original incident image-beam generated by said projector to be used in order to generate the overall on-screen image, thereby ensuring for a higher level of image brightness as compared to the previously described single image-beam system thereof.

Additionally, polarization modulators are placed within the optical paths for each of said primary and secondary image-beams and operated so as to modulate the polarization states of said image-beams in synchronization with the images generated by said projector. Specifically, said polarization modulators are typically arranged so as to impart a first circular polarization state to all left-eye images and a second circular polarization state to all right-eye images, with said first and second circular polarization states being mutually orthogonal. Stereoscopic 3d images can therefore be viewed on the surface of said projection-screen via utilization of suitable passive circular-polarized viewing-glasses according to the prior-art.

It will be understood by one skilled-in-the-art that said triple image-beam system described above possesses a relatively small optical path-length difference between said primary and secondary image-beams as compared to the aforementioned double image-beam system thereof, thereby eliminating the necessity of utilizing a telephoto-lens pair in order to compensate for said optical path-length difference. This therefore reduces the overall complexity and cost of the system.

Moreover, it will also be understood by one skilled-in-the-art that since the total overall optical path-lengths for each of said primary and secondary image-beams within said triple image-beam system are relatively small, then said triple image-beam system will be able to operate together with a projector having a shorter throw-ratio as compared to the aforementioned double image-beam system thereof.

However, recently the use of laser projectors in cinema applications has become widely accepted due to their higher level of light output as compared to typical Xenon type cinema projectors. This enables the generation of stereoscopic 3d images with a higher level of on-screen image brightness. However, since the light generated by typical laser projectors is highly coherent and monochromatic, then the central join in the chevron or V-shaped beam-splitting element typically used in said triple image-beam system according to the state-of-the-art often generates a relatively high level of optical diffraction and other related defects, thereby resulting in the perception of on-screen image artifacts near to the middle of said projection-screen. Moreover, the generation of said on-screen artifacts limit the usefulness of said triple image-beam system according to the state-of-the-art when using laser projectors.

SUMMARY OF THE INVENTION

An object of the present invention is to provide a time-multiplexed stereoscopic 3d projection system that is capable of operating together with a projector having a shorter throw-ratio as compared to other prior-art technologies. A further object of the present invention is to provide a stereoscopic 3d image with improved image quality and on-screen homogeneity when used together with a laser projector.

The invention is based on the insight that in order to be able to operate together with a projector having a short throw-ratio, the optical path-lengths for image-beams passing through said stereoscopic 3d system are mandated to be minimized in order to ensure the sizes of optical components composing said stereoscopic 3d system are kept below practical limitations. Furthermore, in order to improve the optical clarity and on-screen homogeneity when using a laser projector, it is mandated to minimize the occurrence of optical diffraction and other related defects at the centre of any beam-splitting element used in said stereoscopic 3d system thereof.

Moreover, the present invention is further based on the insight that in order to fulfill the requirement of minimizing the optical path-lengths for said image-beams passing through said stereoscopic 3d projection system, it is principally the angular beam divergence in the vertical direction that determines the overall optical path-lengths and not the angular beam divergence in the horizontal direction. This therefore enables a uniaxial condensing lens to be used according to the present invention in order to first reduce the divergence of the incident image-beam in the vertical direction whilst leaving the divergence angle of said incident image-beam in the horizontal direction substantially unperturbed, thereby enabling the optical path-lengths for said image-beams to be significantly reduced. Thereafter, a uniaxial expanding lens is then used to expand the divergent angle in the vertical direction back to its original value for said image-beams exiting said stereoscopic 3d system thereof, hence enabling said stereoscopic 3d projection system according to the present invention to provide for a shorter throw-ratio as compared to other prior-art technologies.

Moreover, a further preferred embodiment of the present invention is that a double image-beam architecture is preferentially used where the beam-splitting element comprises a single plane or plate, thereby mitigating the occurrence of optical diffraction and other related defects at the surface of said single plate thereof. This provides for a stereoscopic 3d projection system according to the present invention that generates an improved level of optical clarity and on-screen homogeneity when used together with a laser projector.

BRIEF DESCRIPTION OF THE FIGURES

The present invention may be better understood and its objects and advantages will become apparent to one skilled-in-the-art by reference to the accompanying drawings, wherein like reference numerals refer to like elements in several of the figures.

DETAILED DESCRIPTION OF THE INVENTION

Figure 1:
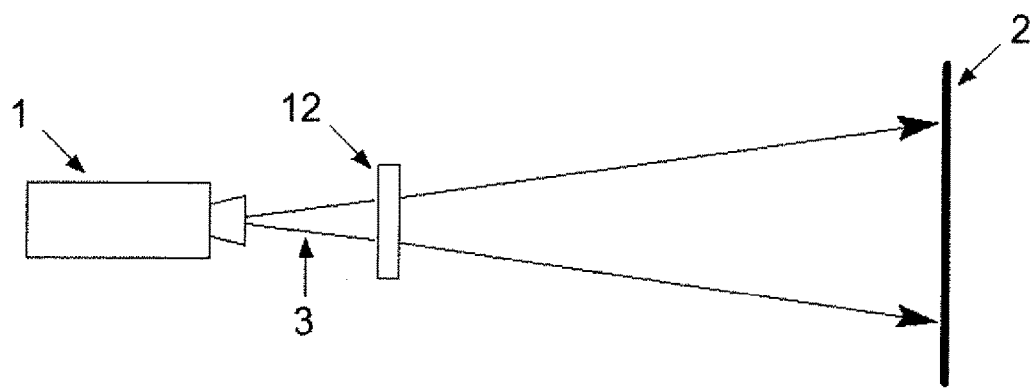
FIG. 1: A time-multiplexed stereoscopic 3d projection system using a single image-beam architecture together with passive-polarized viewing-glasses (not shown) according to the state-of-the-art.

FIG. 1 shows a time-multiplexed stereoscopic 3d projection system based on a single image-beam architecture according to the state-of-the-art where a polarization modulator 12 comprising a stack of one or more liquid crystal elements (not shown) is placed directly in-front of the lens of a projector 1, such as a 3-chip DLP digital cinema projector or otherwise.

The projector 1 generates an incident image-beam 3 comprising a succession of alternate left and right-eye images at high frequency of typically 144 Hz and said polarization modulator 12 is typically arranged so as to impart a first circular polarization state to all left-eye images and a second circular polarization state to all right-eye images respectively, with said first and second circular polarization states being mutually orthogonal.

Thereaftr, said left and right-eye images are focused onto the surface of a polarization-preserving projection-screen 2 such as a silver-screen or otherwise, thereby enabling the viewing of time-multiplexed stereoscopic 3d images on the surface of said projection-screen via utilization of passive circular-polarized viewing-glasses (not shown).

Moreover, since typical cinema projectors currently on the market such as 3-chip DLP projectors generate images that are initially randomly polarized, it will be known to one skilled-in-the-art that a linear polarization-filter (not shown) is typically required to be located in close proximity to the input surface of said polarization modulator 12. However, said linear polarization-filter will absorb approximately 50% of the incoming light initially generated by said projector 1, thereby significantly reducing the overall optical light efficiency of said single image-beam system according to the state-of-the-art and resulting in the creation of stereoscopic 3d images that are severely lacking in on-screen image brightness.

Figure 2:
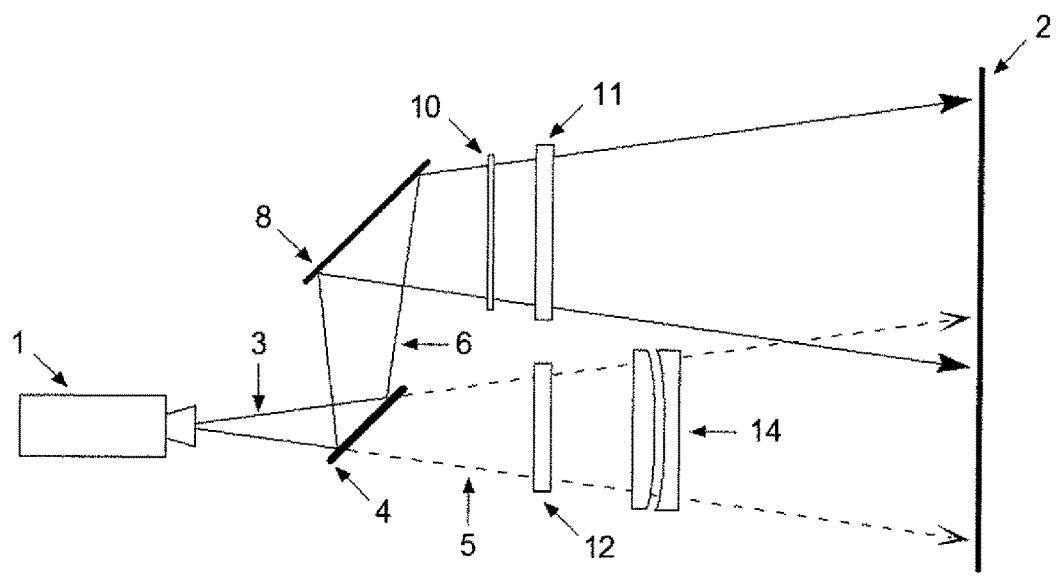
FIG. 2: A time-multiplexed stereoscopic 3d projection system using a double image-beam architecture together with passive-polarized viewing-glasses (not shown) according to the state-of-the-art.

FIG. 2 shows an alternative time-multiplexed stereoscopic 3d projection system comprising a double image-beam architecture according to the state-of-the-art. Here, a projector 1 emits an incident image-beam 3 comprising a succession of alternate left and right-eye images at high frequency of typically 144 Hz. The image-beam 3 impinges on a polarization beam-splitting element 4 which separates said incident image-beam 3 into one primary image-beam 5 propagating in the same direction as said incident image-beam 3 and possessing a first state of linear polarization, and one secondary image-beam 6 propagating in a perpendicular direction relative to said original incident image-beam 3 and possessing a second state of linear polarization, with said first and second states of linear polarization being mutually orthogonal. Said beam-splitting element 4 typically comprises a single beam-splitting plate or alternatively a single beam-splitting surface according to the state-of-the-art.

There is also provided a reflecting surface 8, such as a silver-mirror or otherwise, which is arranged so as to deflect the optical path for said secondary image-beam 6 towards a polarization-preserving projection-screen 2, such as a silver-screen or otherwise. The images generated on the surface of said projection-screen 2 by said primary and secondary image-beams 5, 6 thereof are then arranged so as to mutually overlap by a substantial amount in order to recreate a complete image on the surface of said projection-screen. This allows both polarization components composing said original incident image-beam 3 to be used in order to generate the overall on-screen image, thereby ensuring for a higher level of image brightness as compared to the aforementioned single image-beam architecture according to the prior-art.

Additionally, a polarization rotator 10 is typically located on the optical path for said secondary image-beam 6 and arranged so as to convert the linear polarization state of said secondary image-beam 6 to that of said primary image-beam 5, thereby ensuring that both said primary and secondary image-beams 5, 6 thereafter possess the same state of linear polarization. Furthermore, one or more polarization modulators 11, 12 are then used to rapidly modulate the state of polarization for each of said primary and secondary image-beams 5, 6 thereof between a left and right circular polarization state in synchronization with the images generated by said projector 1. Specifically, it is arranged such that all left-eye images generated on the surface of said projection-screen 2 possess a first state of circular polarization, and all right-eye images generated on the surface of said projection-screen 2 possess a second state of circular polarization, with said first and second states of circular polarization being mutually orthogonal. This enables a stereoscopic 3d image to be viewed on the surface of said projection-screen 2 via utilization of passive circular-polarized viewing-glasses (not shown) according to the state-of-the-art.

Moreover, it will be understood by one skilled-in-the-art that since there is a relatively large optical path-length difference between said primary image-beam 5 and said secondary image-beam 6 when using said double image-beam system according to the state-of-the-art, then a telephoto-lens pair 14 is typically placed in the optical path for said primary image-beam 5 in order to compensate for said optical path-length difference. A telephoto-lens is characterized by said lens possessing a relatively long focal-length and is capable of focusing a mutually parallel incident light-beam to substantially a single point, referred to as the focal-point. Therefore, said telephoto-lens is mandated to have at least one surface that is curved around two mutually orthogonal axes in order to form a spherical or ellipsoidal shape and will result in incident light being either converged or diverged in both the vertical and horizontal directions simultaneously.

Moreover, the use of said telephoto-lens pair 14 enables the magnification of said primary image-beam 5 to be changed and controlled, thereby compensating for said optical path-length difference and providing a stereoscopic 3d image with a high level of on-screen image alignment according to the prior-art.

However, many modern cinema auditoriums require the use of a projector with a short throw-ratio. Moreover, in order to achieve a short throw-ratio it will be understood by one skilled-in-the-art that the angular divergence of said incident image-beam 3 emitted by said projector 1 is mandated to be relatively high. For example, in order to achieve a throw-ratio of 1.2 (dimensionless unit) the angular beam divergence in the horizontal direction is mandated to be 45.2 degrees, and for a throw-ratio equal to 1.0 the horizontal angular beam divergence increases to 53.1 degrees. Moreover, for a throw-ratio of only 0.8 the mandated horizontal angular beam divergence increases to 64.0 degrees.

However, it will be understood by one skilled-in-the-art that since the total overall path-length for at least said secondary image-beam 6 is relatively long, then the large angular divergence of said incident image-beam 3 when using a projector with a short throw-ratio will mandate the use of very large optical components. This includes said beam-splitting element 4, reflecting surface 8, polarization rotator 10, polarization modulators 11, 12 and telephoto-lens pair 14 thereto. However, due to both practical and engineering limitations on the maximum possible sizes of said optical components thereof, said double image-beam system according to the state-of-the-art is severely limited by the minimum throw-ratio that can be achieved.

Figure 3:
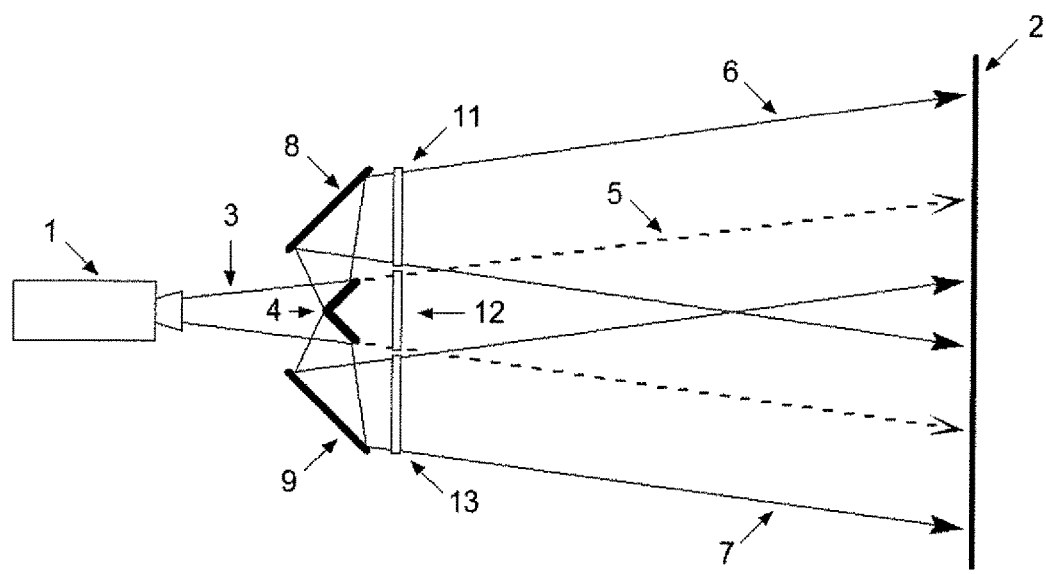
FIG. 3: A time-multiplexed stereoscopic 3d projection system using a triple image-beam architecture together with passive-polarized viewing-glasses (not shown) according to the state-of-the-art.

FIG. 3 shows an alternative time-multiplexed stereoscopic 3d projection system based on a triple image-beam architecture according to the state-of-the-art. Here, a beam-splitting element 4 is used to separate the randomly polarized incident image-beam 3 generated by a single-lens projector 1 into one primary image-beam 5 propagating in the same direction as said original incident image-beam 3 and possessing a first state of linear polarization, and two secondary image-beams 6, 7 propagating in mutually opposite directions that are also both substantially perpendicular to said original incident image-beam 3 and possessing a second state of linear polarization, with said first and second linear polarization states being mutually orthogonal. Said beam-splitting element 4 typically comprises of two separate plates or planes joined together along one edge to form a chevron or V-shape structure and with the connecting edge for each of said plates being beveled at substantially 45 degrees in order to allow both said plates to be placed together in close proximity, hence minimizing the size of the gap in-between said connecting plates.

Thereafter, reflecting surfaces 8, 9 such as silver-mirrors or otherwise are provided in order to deflect the optical paths for each of said secondary image-beams 6, 7 thereof towards a polarization-preserving projection-screen 2 and arranged such that said primary and secondary image-beams 5, 6, 7 partially overlap in order to mutually combine and recreate a complete image on the surface of said projection-screen. Such triple image-beam systems therefore allow both polarization components composing said original incident image-beam 3 to be used in order to generate the overall on-screen image, thereby ensuring for a higher level of image brightness as compared to the aforementioned single image-beam system.

Additionally, polarization modulators 11, 12, 13 are placed within the optical paths for each of said primary and secondary image-beams 5, 6, 7 thereof and operated so as to modulate the polarization states of said image-beams in synchronization with the images generated by said projector 1. Moreover, said polarization modulators 11, 12, 13 typically each comprise a stack of two individual pi-cell liquid crystal elements (not shown) aligned in mutually crossed orientation and operated so as to rapidly modulate the linear polarization states of said primary and secondary image-beams 5, 6, 7 thereof between a left and right circular polarization state in synchronization with the images generated by said projector.

Specifically, it is typically arranged such that all left-eye images generated on the surface of said projection-screen 2 possess a first state of circular polarization, and all right-eye images generated on the surface of said projection-screen 2 possess a second state of circular polarization, with said first and second states of circular polarization being mutually orthogonal. This enables a time-multiplexed stereoscopic 3d image to be viewed on the surface of said projection-screen 2 via utilization of passive circular-polarized viewing-glasses (not shown) according to the state-of-the-art.

Moreover, it will be understood by one skilled-in-the-art that the difference in optical path-lengths between said primary image-beam 5 and each of said secondary image-beams 6, 7 thereof composing said triple image-beam system according to the state-of-the-art is now relatively small, hence no longer mandating the use of a telephoto-lens pair or otherwise in order to compensate for said small difference in optical path-lengths.

Furthermore, it will also be understood by one skilled-in-the-art that since the overall optical path-lengths for said primary image-beam 5 and each of said secondary image-beams 6, 7 thereto within said triple image-beam system according to the state-of-the-art are now relatively short, then said triple image-beam system will be able to achieve a shorter throw-ratio as compared to the aforementioned double image-beam system thereof.

However, the use of laser projectors in cinema applications has recently become widely accepted due to their higher level of light output and color saturation as compared to typical Xenon based cinema projectors. This enables the generation of stereoscopic 3d images with a higher level of on-screen image brightness. However, since the light generated by a typical laser projector is highly coherent and monochromatic, then the central join in the chevron or V-shaped beam-splitting element 4 typically used in said triple image-beam system according to the state-of-the-art often generates a relatively high level of optical diffraction and other related defects, thereby resulting in the perception of on-screen image artifacts near to the middle of said projection-screen 2. Moreover, the generation of said on-screen artifacts limit the usefulness of said triple image-beam system according to the state-of-the-art when using laser projectors.

Figure 4:
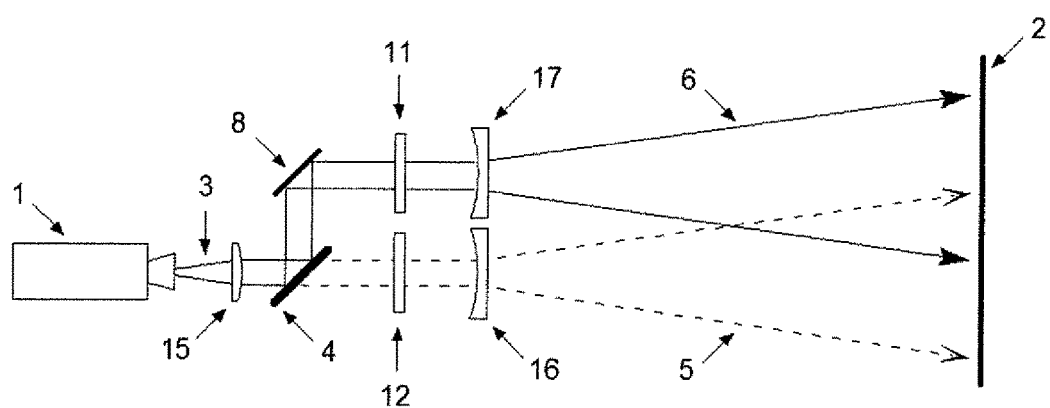
FIG. 4: A time-multiplexed Stereoscopic 3d projection system using a double image-beam architecture with at least one uniaxial condensing lens and one uniaxial expanding lens together with passive-polarized viewing-glasses (not shown) according to a preferred embodiment of the present invention.

FIG. 4 shows a time-multiplexed stereoscopic 3d projection system according to a preferred embodiment of the present invention. Here, a projector 1 emits an incident image-beam 3 comprising a succession of alternate left and right-eye images at high frequency of typically 144 Hz. The image-beam 3 then impinges on a polarization beam-splitting element 4 which separates said incident image-beam 3 into one primary image-beam 5 propagating in the same direction as said incident image-beam 3 and possessing a first state of linear polarization, and at least one secondary image-beam 6 propagating in a perpendicular direction relative to said original incident image-beam 3 and possessing a second state of linear polarization, with said first and second states of linear polarization being mutually orthogonal.

There is also provided a reflecting surface 8, such as a silver-mirror or otherwise, which is arranged so as to deflect the optical path for said secondary image-beam 6 towards a polarization-preserving projection-screen 2, such as a silver-screen or otherwise. The images generated on the surface of said projection-screen 2 by said primary and secondary image-beams 5, 6 thereof are then arranged so as to mutually overlap in order to recreate a complete image on the surface of said projection-screen. This allows both polarization components composing said original incident image-beam 3 to be used in order to generate the overall on-screen image, thereby ensuring for a high level of image brightness.

Additionally, polarization modulators 11, 12 are used to rapidly modulate the state of polarization for each of said primary and secondary image-beams 5, 6 thereof between a first and second modulated state of polarization in synchronization with the images generated by said projector 1. For example, said first modulated state of polarization may be left circular polarization, and said second modulated state of polarization may be right circular polarization, respectively. However, said first and second modulated states of polarization may instead comprise of other types of polarization, such as but not limited to linear polarization or alternatively elliptical polarization without departing from the inventive ideas disclosed herein.

Moreover, a preferred embodiment of the present invention is that all left-eye images generated on the surface of said projection-screen 2 are arranged to possess a first state of circular polarization, and all right-eye images generated on the surface of said projection-screen 2 are arranged to possess a second state of circular polarization, with said first and second states of circular polarization being mutually orthogonal. This enables a stereoscopic 3d image to be viewed on the surface of said projection-screen 2 via utilization of passive circular-polarized viewing-glasses (not shown).

Additionally, there is provided a uniaxial condensing lens 15 placed within the optical path for said incident image-beam 3 and positioned between said projector 1 and said polarization beam-splitting element 4 according to a preferred embodiment of the present invention. A uniaxial condensing lens is characterized by said lens having at least one surface that is curved around a single axis, for example being curved around the horizontal axis, and hence will only reduce the angular beam divergence in the vertical direction for said incident image-beam 3 thereof whilst leaving the angular beam divergence in the horizontal direction substantially unperturbed. Moreover, it will be understood by one skilled-in-the-art that it is principally the angular beam divergence in the vertical direction that determines the overall optical path-length for said secondary image-beam 6 thereof, hence the use of said uniaxial condensing lens 15 according to the present invention enables the sizes of optical components composing said stereoscopic 3d projection system to be kept below practical limitations.

Furthermore, there are also provided uniaxial expanding lenses 16, 17 placed within the optical paths for each of said primary and secondary image-beams 5, 6 respectively and arranged so as to increase the divergent angle in the vertical direction for each of said primary and secondary image-beams thereto whilst leaving the divergent angle in the horizontal direction for each of said primary and secondary image-beams substantially unperturbed. Each of said uniaxial expanding lenses 16, 17 are preferably positioned between said polarization beam-splitting element 4 and said polarization-preserving projection-screen 2 according to a preferred embodiment of the present invention disclosed herein. A uniaxial expanding lens is characterized by said lens having at least one surface that is curved around a single axis, for example with said surface being curved around the horizontal axis, and hence will only increase the angular beam divergence in the vertical direction for said primary and secondary image-beams 5, 6 thereof whilst leaving the angular beam divergence in the horizontal direction substantially unperturbed. This enables said stereoscopic 3d projection system according to the present invention to provide for a shorter throw-ratio as compared to other prior-art technologies.

The polarization beam-splitting element 4 preferably comprises a single beam-splitting plate such as a wire-grid polarizer or otherwise, or alternatively a single beam-splitting surface such as but not limited to a multi-layer coating that may or may not be sandwiched in-between two or more glass plates or prisms. Moreover, it will be understood by one skilled-in-the-art that the use of a single polarization beam-splitting plate or surface will minimize the amount of optical diffraction and other defects occurring at the surface of said plate or surface, thereby enabling said stereoscopic 3d projection system according to a preferred embodiment of the present invention to provide a stereoscopic 3d image with good optical quality and on-screen homogeneity when used together with a laser projector.

Figure 5:
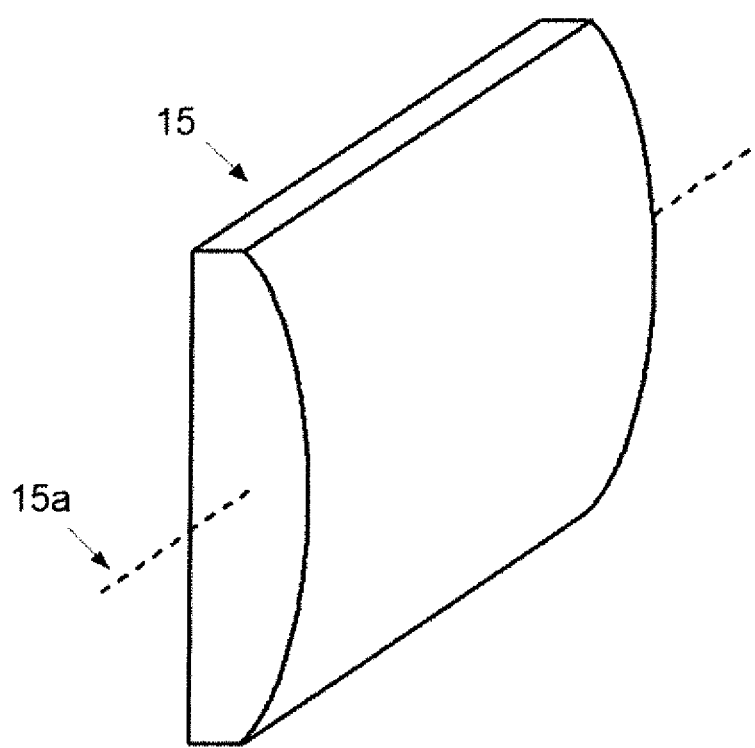
FIG. 5: Uniaxial condensing lens according to a preferred embodiment of the present invention.

FIG. 5 shows the detailed design of said uniaxial condensing lens 15 according to a preferred embodiment of the present invention. It is disclosed that at least one surface for said uniaxial condensing lens is curved around a single axis 15a, for example with said surface being curved about the horizontal axis. Consequently, said uniaxial condensing lens will possess positive optical-power in the vertical direction and hence focus a mutually parallel incident light-beam to substantially a one-dimensional line. Said uniaxial condensing lens may comprise of cylindrical lenses, and when said uniaxial condensing lens converges a light-beam in one dimension (i.e magnifies in the vertical direction) it may be referred to as being plano-convex. Moreover, said curved surface for said uniaxial condensing lens may preferably be designed in order to minimize the occurrence of chromatic aberration, for example said uniaxial condensing lens may comprise of one or more acylindrical lenses, or alternatively said uniaxial condensing lens may comprise of a cylindrical achromatic doublet. Furthermore, said uniaxial condensing lens may instead comprise of a Fresnel lens that provides magnification in one dimension in order to reduce the overall size and weight of said stereoscopic 3d projection system according to another embodiment of the present invention.

Figure 6:
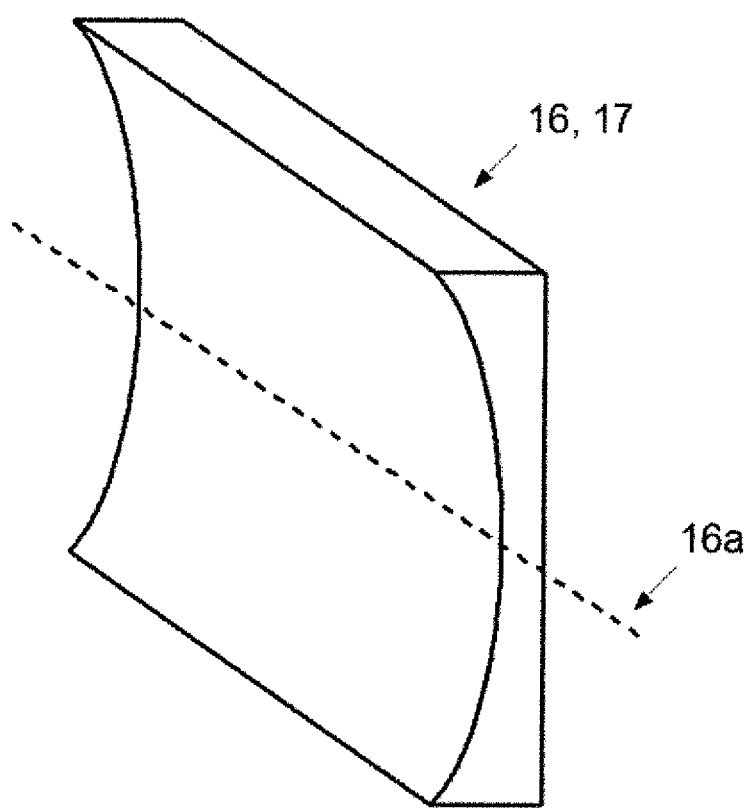
FIG. 6: Uniaxial expanding lens according to a further preferred embodiment of the present invention.

FIG. 6 shows the detailed design for each of said uniaxial expanding lenses 16, 17 thereof according to a further preferred embodiment of the present invention. It is disclosed that at least one surface for each of said uniaxial expanding lenses is curved around a single axis 16a, for example with said surface being curved about the horizontal axis. Consequently, said uniaxial expanding lens will possess negative optical-power in the vertical direction and will result in an incident image-beam being expanded in one dimension. Once again, said uniaxial expanding lens may comprise of a cylindrical lens, and when said uniaxial expanding lens provides beam divergence in one dimension it is typically referred to as being plana-concave. Moreover, said uniaxial expanding lens may preferably comprise of an acylindrical lens, or alternatively a cylindrical achromatic doublet in order to minimize the occurrence of chromatic aberration. Furthermore, in order to reduce the overall size and weight of said stereoscopic 3d projection system according to a further embodiment of the present invention, said uniaxial expanding lens may alternatively comprise of one or more Fresnel lenses that diverge an image-beam in one dimension.

Moreover, in a further preferred embodiment of the present invention, the positive optical-power of said uniaxial condensing lens 15 is arranged to be substantially equal in magnitude to the absolute value of the negative optical-power for each of said uniaxial expanding lenses 16, 17 thereof. This ensures that the angular beam divergence for both the exiting primary image-beam 5 and exiting secondary image-beam 6 in both the vertical and horizontal directions are substantially identical to the angular beam divergence for said incident image-beam 3 thereof.

It will be understood by one skilled-in-the-art that the utilization of said uniaxial condensing lens 15 and each of said uniaxial expanding lenses 16, 17 thereto will ensure the optical path-length difference between said primary image-beam 5 and said secondary image-beam 6 for said stereoscopic 3d projection system according to the present invention will be smaller as compared to that for other prior-art technologies, thereby ensuring that the on-screen image generated by said primary image-beam 5 is similar in size to the on-screen image generated by said secondary image-beam 6 thereof. This enables both said on-screen images to be mutually aligned with a high level of accuracy.

Moreover, in order to further improve the on-screen image alignment, it is disclosed that the position of said uniaxial expanding lens 17 may preferentially be adjusted so as to change by a small amount the height of the on-screen image generated by said secondary image-beam 6 thereof, thereby ensuring that each of said on-screen images thereafter have substantially the same height. In order to fulfill this criterion, it will be understood by one skilled-in-the-art that in general said uniaxial expanding lens 17 is required to be moved a little closer towards said projection-screen 2 as compared to said uniaxial expanding lens 16 in order to reduce the height of the on-screen image generated by said secondary image-beam 6 thereof. Alternatively, the height for each of said on-screen images can be arranged to be substantially the same by instead adjusting the positioning of said uniaxial expanding lens 16 in order to achieve the same effect according to a further embodiment of the present invention.

Furthermore, it is also disclosed that the plane of said reflecting surface 8 can be deformed by a small amount around a single axis in order to reduce the width of the on-screen image generated by said secondary image-beam 6 thereof in order to ensure both said on-screen images generated by each of said primary and secondary image-beams 5, 6 thereafter have the same width. This enables each of said on-screen images to possess substantially the same sizes, thereby further improving the overall on-screen image alignment as compared to other prior-art technologies.

Moreover, it will also be understood by one skilled-in-the-art that the angular positioning or orientation of said reflecting surface 8 may be adjusted in order to ensure each of said on-screen images generated by said primary and secondary image-beams 5, 6 thereof mutually overlap to a substantial extent on the surface of said projection-screen 2, hence providing for a high level of on-screen image alignment.

The present invention has been illustrated herein using a double image-beam architecture where the incident image-beam is separated into one primary image-beam and one secondary image-beam thereto. However, said invention may also be practiced using a triple image-beam architecture where the incident image-beam is instead split into one primary image-beam and two secondary image-beams. Furthermore, a uniaxial condensing lens can then be placed within the optical path for said incident image-beam and positioned between said projector and said polarization beam-splitting element, and at least one uniaxial expanding lens can be placed within the optical path for at least one of said secondary image-beams thereof and positioned between said polarization beam-splitting element and said polarization-preserving projection-screen. This will reduce the optical path-length for each of said secondary image-beams within said triple image-beam system according to a further embodiment of the present invention and hence improve the overall on-screen image alignment as compared to other prior-art technologies.

Whilst preferred embodiments of the present invention have been shown and described herein, various modifications may be made thereto without departing from the inventive idea of the present invention. Specifically, the invention has been illustrated together with a double image-beam architecture, but it will be understood that the disclosed invention can also be practiced together with stereoscopic 3d projection systems based on either a single image-beam architecture or alternatively a triple image-beam architecture without departing from the inventive ideas disclosed herein. Accordingly, it is to be understood that the present invention has been described by way of illustration and not limitation.

What is claimed:

1. A time-multiplexed stereoscopic 3d projection system, comprising:
   a projector emitting an incident image-beam comprising a rapid succession of alternate left and right-eye images;
   a polarization beam-splitting element arranged to separate said incident image-beam into one primary image-beam propagating substantially in the same direction as said incident image-beam and possessing a first state of polarization, and at least one secondary image-beam propagating substantially in a mutually orthogonal direction to said incident image-beam and possessing a second state of polarization;
   a reflecting surface operable to deflect the optical path of at least one of said primary and secondary image-beams towards the surface of a polarization-preserving projection-screen;
   at least one polarization modulator being placed within the optical path for each of said primary and secondary image-beams thereof and arranged so as to modulate the polarization states for each of said primary and secondary image-beams between a first modulated state of polarization and a second modulated state of polarization in synchronization with the images generated by said projector;
   a uniaxial condensing lens placed within the optical path for said incident image-beam and positioned between said projector and said polarization beam-splitting element; and
   at least one uniaxial expanding lens placed within the optical path for at least one of said primary and secondary image-beams thereof and positioned between said polarization beam-splitting element and said polarization-preserving projection-screen.

2. A time-multiplexed stereoscopic 3d projection system according to claim 1 wherein said uniaxial condensing lens has at least one surface that is curved about a single axis.

3. A time-multiplexed stereoscopic 3d projection system according to claim 1 wherein said at least one uniaxial expanding lens has at least one surface that is curved about a single axis.

4. A time-multiplexed stereoscopic 3d projection system according to claim 1 wherein said first modulated state of polarization is left circular polarization, and said second modulated state of polarization is right circular polarization.

5. A time-multiplexed stereoscopic 3d projection system according to claim 1 wherein each of said first and second modulated states of polarization comprise of linear polarization.

6. A time-multiplexed stereoscopic 3d projection system according to claim 1 wherein each of said first and second modulated states of polarization comprise of elliptical polarization.

7. A time-multiplexed stereoscopic 3d projection system according to claim 1 wherein said polarization beam-splitting element comprises at least one planar surface further comprising one of a wire-grid polarizer and multi-layer coating.

8. A time-multiplexed stereoscopic 3d projection system according to claim 1 wherein said incident image-beam is separated by said polarization beam-splitting element into one primary image-beam and two secondary image-beams in order to create a triple-beam architecture.

9. A time-multiplexed stereoscopic 3d projection system according to claim 1 wherein said uniaxial condensing lens has a first value of positive optical-power in at least one axis, and said uniaxial expanding lens has a second value of negative optical-power in at least one axis, with the absolute values of said first and second optical-powers being substantially identical.

10. A time-multiplexed stereoscopic 3d projection system according to claim 1 wherein there is provided a first uniaxial expanding lens placed within the optical path of said primary image-beam, and a second uniaxial expanding lens placed within the optical path of said secondary image-beam thereof, with both said first and second uniaxial expanding lenses being positioned between said polarization beam-splitting element and said polarization-preserving projection-screen.

11. A time-multiplexed stereoscopic 3d projection system according to claim 10 wherein the optical-power for said first and second uniaxial expanding lenses are substantially identical.

12. A time-multiplexed stereoscopic 3d projection system according to claim 10 wherein the position of said second uniaxial expanding lens is adjusted in order to modify the height of the on-screen image generated by said secondary image-beam thereof.

13. A time-multiplexed stereoscopic 3d projection system according to claim 1 wherein the plane of said reflecting surface is adjusted or deformed in order to modify the width of the on-screen image generated by said secondary image-beam thereof.

14. A time-multiplexed stereoscopic 3d projection system according to claim 1 wherein the orientation of said reflecting surface is adjusted in order to modify the position of the on-screen image generated by said secondary image-beam thereof.

15. A time-multiplexed stereoscopic 3d projection system according to claim 1 wherein at least one of said uniaxial condensing lens and uniaxial expanding lens comprises at least one of a cylindrical lens, acylindrical lens, cylindrical achromatic doublet, Fresnel lens or any combination thereof.

* * * * *